Patented Nov. 16, 1943

2,334,186

UNITED STATES PATENT OFFICE 2,334,186

ORGANIC SULPHONAMIDES AND THEIR PREPARATION

Arthur L. Fox, Woodstown, N. J., assignor to E. I. du Pont de Nemours & Company, Wilmington, Del., a corporation of Delaware No Drawing. Application December 20, 1938, Serial No. 246,903

3 Claims. (Cl. 260—556)

This invention relates to the preparation of organic sulphonamides, more particularly it relates to the preparation of organic sulphonamides from the reaction products obtained by reacting organic compounds, preferably saturated hydrocarbons, with a gaseous mixture of sulphur dioxide and chlorine after the manner set forth in Reed U. S. Patent 2,046,090, and Fox, Henke, Lockwood and Tinker application, Serial No. 216,838, filed June 30, 1938 now U. S. Patent 2,202,791. The invention also relates to complex mixtures of sulphonamides as new products.

When a saturated hydrocarbon or a mixture of such hydrocarbons is reacted with a gaseous mixture of sulphur dioxide and chlorine at a temperature below the decomposition point of the formed organic sulphonyl chlorides in the above-identified manner, a rather complex mixture of products is formed which contains hydrocarbon monosulphonyl chlorides, chlorhydrocarbon monosulphonyl chlorides, chlor-hydrocarbon polysulphonyl chlorides, hydrocarbon polysulphonyl chlorides and chlorohydrocarbons. Similar results are obtained with hydrocarbon derivatives. The proportion of products in the mixture can be varied somewhat by varying the proportions of sulphur dioxide to chlorine, the rate of flow, the intensity of the actinic light used to accelerate the reaction, pressure, and temperature conditions.

In the case where the saturated open chain hydrocarbons and derivatives thereof, e. g. non-gaseous n-alkanes, isoalkanes, chloroalkanes and mineral oil fractions free from aromatic and unsaturated constituents are used as initial reactants, the mixtures are usually complex since the sulphonyl chloride groups do not enter the same position in each molecule. Hence the resulting sulphonamides are quite complex when the entire fraction or a portion thereof which consists essentially of sulphonyl chlorides, are used for the amide reaction.

The reaction products obtained from using saturated cycloaliphatic hydrocarbons, e. g. cyclohexane, menthane, camphane, etc. as initial reactants are not quite as complex and the sulphonamides which may be prepared in accordance with the teachings hereof can be easily separated as pure compounds.

This invention has for an object the preparation of new organic sulphonamides. A further object is the development of new processes for the preparation of organic sulphonamides. A further object is the preparation of sulphonamides from a cheap source of reactant materials. Still further objects include the preparation of organic sulphonamides in commercial quantities and a general advancement of the art. Still other objects will appear hereinafter.

The above and other objects are accomplished according to the present invention by reacting ammonia or sufficiently reactive organic primary or secondary amines with the reaction products obtained by reacting a saturated hydrocarbon or a derivative thereof with a gaseous mixture of sulphur dioxide and chlorine.

The hydrocarbon sulphonyl chlorides prepared as disclosed herein may be dissolved in a dry solvent such as benzene, toluene, ligroin, in which ammonium chloride is insoluble, etc., and ammonia gas passed in. The reaction produces ammonium chloride which is insoluble in the solvent and the hydrocarbon sulphonamides corresponding to the hydrocarbon sulphonylchlorides soluble in the solvent. The ammonium chloride may be filtered off and the hydrocarbon sulphonamides may then be obtained by removing the solvent. This may be done by evaporating off the solvent, by removing the solvent by steam distillation or by extracting the sulphonamide from the solvent by caustic alkali. In place of the ammonia gas, gaseous amines such as methyl or dimethyl amine or mixtures of these and other amines or ammonia may be used.

An alternative method of converting the above-described organic sulphonyl chlorides to sulphonamides is to add the sulphonyl chloride direct to the liquid amine such as mono or dimethylamine or to liquid ammonia. This operation is more efficient when it is carried out with cooling and prevents the loss of the amine or the liquid ammonia. When the organic sulphonyl chloride and the nitrogen base have been mixed and the reaction has gone to completion, the residual nitrogen base is allowed to evaporate and leaves behind a salt such as ammonium chloride, methyl amine hydrochloride or dimethyl amine hydrochloride as the case may be. These salts are water soluble and may therefore be easily separated from the sulphonamide by extraction with water or aqueous solutions.

In a further alternative form of this invention wherein non-volatile amines are used, it has been found practical to dissolve the organic sulphonyl chlorides in a solvent and to run this into the liquid or liquefiable amine. The reactivity of amines varies greatly and while some of the lower ones such as methyl amine react vigorously even at low temperatures with the organic sulphonyl chlorides of this invention, others react very slowly and heating the reaction mass sometimes has to be resorted to in order to induce the reaction to run.

Another method which has been used with success is the use as a condensing medium of a polar solvent such as acetic acid to which has been added anhydrous sodium acetate. This method has been particularly valuable as applied to amines of the anthraquinone series.

Still another method employed is to heat a liquid amine, e. g. aniline, with the sulphonyl chloride in the absence of solvents. In this case, however, an excess of the amine should be used as a binding agent for the hydrochloric acid formed in the process.

Still another method of preparing these sulphonamides is by heating the corresponding sulphonyl chlorides to a high temperature with aqueous ammonia in a bomb or autoclave.

The preparation of the hydrocarbon sulphonyl chloride-chlorohydrocarbon sulphonyl chloride mixture which is representative of an initial material suitable for the present invention is exemplified by the following procedures: A gram molecular weight of a normally liquid saturated aliphatic or alicyclic hydrocarbon is placed in a glass container and an electric light is placed close to it. A mixture of sulphur dioxide gas and chlorine gas, preferably at least 2 mols to one of chlorine, is then passed into the hydrocarbon. Some means of dispersing the gas such as a sintered glass distributor, agitation, etc. should be used. As the mixture of sulphur dioxide and chlorine enters the liquid, the temperature rises and cooling should be applied if the temperature rises too high. For low boiling hydrocarbons this cooling is very essential in order to avoid excessive losses of hydrocarbon. The weight of the reaction mass is taken from time to time and when a gain in weight equal to about 10–20% more than theory for the introduction of one $SO_2Cl$ group has occurred, the reaction is stopped and the reaction product is blown with dry nitrogen, carbon dioxide or other inert gas. The residue is the crude sulphonyl chloride used in the following experiments and consists of 60–90% of a mixture of sulphonyl chlorides and chloro sulphonyl chlorides the remainder being unreacted hydrocarbon and chlorinated hydrocarbon.

The invention will be further illustrated, but is not to be limited by the following examples in which the parts stated are parts by weight, unless otherwise indicated. In these examples, it should be distinctly understood that the sulphonyl chlorides described in each of the examples are prepared from a normally liquid or easily liquefiable hydrocarbon and a gaseous mixture of sulphur dioxide and chlorine under the conditions set forth in the Fox, Henke, Lockwood and Tinker application, Serial No. 216,838, now U. S. Patent 2,202,791 above referred to.

Example I

A mixture of 100 grams of cetane sulphonyl chloride (analysis: Cl 23.65%, S 12.21%) and 100 grams of aniline were heated with stirring in a water bath at 95–100° C. for 4 hours; then it was stirred for 5 hours with 1,000 cc. 3% hydrochloric acid and the oil separated and stirred again with a fresh 1,000 cc. 3% hydrochloric acid. The thick taffy like oil was then stirred twice for 5 hours with 500 cc. portions of water and was then dried under vacuum on a steam bath. The yield of phenyl sulphonamide was 111 g. Analysis: sulphur 9.33%, chlorine 8.59% and nitrogen 1.19%.

Example II

A mixture of 50 g. chlor cetane sulphonyl chloride (analysis: Cl 23.65%, S 12.21%) and 100 cc. of ammonium hydroxide were heated in a bomb at 200° C. for 5 hours. On opening, a light colored product was obtained from which an oil was separated. The oil was extracted with ether and the ether evaporated off. Chlor cetane sulphonamides were recovered. Analysis: sulfur 6.55%, nitrogen 2.45% and chlorine 1.22%. This is a ratio of one nitrogen to 1.17 sulphur.

Example III

A mixture of 100 grams chlor cetane sulphonyl chloride (analysis: Cl 23.65%, S 12.21%) and 500 cc. benzene were mixed and dry ammonia gas was passed into the same for 3 hours and the benzene then evaporated off under vacuum. The residue was dissolved in 500 cc. water and sufficient alkali to take into solution. The sulphonamide was then precipitated with acid as an oil and was separated and dried. A yield of 75 grams was obtained.

Example IV

A mixture of 120 g. chlor-n-heptyl sulphonyl chloride (analysis: Cl 29.57%, S 15.92%) and 100 cc. benzene were mixed and to this solution was added slowly 100 g. n-butylamine. The reaction was very vigorous until 80 g. had been added, after that it was not particularly vigorous. The reaction mass was warmed at 60° on a water bath for one hour. The solid butylamine hydrochloride was then filtered off and the filtrate was evaporated under vacuum on a steam bath. The product was vacuum distilled and a fraction boiling at 180–230° at 7 mm. was obtained. This fraction contained 11.35% nitrogen, 25% chlorine and 3.34% sulphur. It was contaminated with butylamine hydrochloride.

Example V

Chlor cetane isobutyl sulphonamide was prepared by reacting 50 grams of chlor cetane sulphonyl chloride (analysis: Cl 15.11%, S 10.60%), in 500 cc. of benzene with 21. g. of isobutylamine dissolved in 50 cc. of benzene. A vigorous reaction occurred and the mass was allowed to stand overnight and filtered from isobutylamine hydrochloride and then washed with water. The benzene layer was separated and the benzene evaporated off on a steam bath. A yield of 38 grams was obtained.

Example VI

A mixture of 75 grams chlor petrolatum sulphonyl chloride (analysis: Cl 18.53%, S 7.44%) and 32 grams aniline was heated in a boiling water bath for 3 hours and then stirred with 200 cc. dilute hydrochloric acid for one hour. The thick tarry residue was taken into the solution with sodium hydroxide and separated from a small amount of insoluble material and the clear brown solution precipitated with acid and the phenyl sulphonamide of chlor petrolatum was separated as a very thick viscous tar which was dried on a steam bath. The yield was 73 grams.

Example VII

Ninety-two grams of chlor Asiatic wax sulphonyl chloride (analysis: Cl 28.34%, S 15.01%) as heated with 20 grams aniline on the steam bath for 3 hours, then washed with dilute acid and dried.

Example VIII

Beta - hydroxy - ethyl-chlor - cetane sulphonamides were prepared by reacting 119 grams of chlor cetane sulphonyl chloride (analysis: Cl 17.16%, S 9.76%), dissolved in 500 cc. alcohol and 42 grams monoethanolamine. The reaction was very vigorous causing the solution to just reach the boil. The reaction mass was evaporated on the steam bath and gave 170 g. of a thick yellow oil. It was contaminated with ethanolamine hydrochloride.

Example IX

Two hundred and fifty grams of chlor hexane sulphonyl chlorides (analysis: Cl 26.15%, S 16.52%) were dissolved in 500 cc. dry benzene and ammonia gas passed in for 3 hours. The mass heated up considerably and a light brown precipitate formed. The product was then extracted with 1 liter water which removed the ammonium chloride formed. The benzene layer was evaporated yielding 92 g. thick black oil. Analysis: sulphur 16.89%, chlorine 11.92% and nitrogen 5.52%.

Example X

Five hundred grams of chlor white oil sulphonyl chlorides (analysis: Cl 19.94%, S 9.55%) was placed in 1500 cc. dry benzene and dry ammonia gas passed in for one hour. Considerable heat was generated at first. The benzene solution was washed with water to separate the ammonium chloride and was then steam distilled until all of the benzene had been removed. The residue was diluted to 2 liters using 300 cc. alcohol and the rest water, and the heavy oil weighing 470 g. was drawn off. This was dried on a water bath under a high vacuum. Yield 401 g. Analysis: chlorine 9.5%, sulphur 8.0% and nitrogen 2.82%.

Example XI

Four hundred grams of chlor white oil sulphonyl chlorides (analysis: S 10.1%, Cl 16.3%) and 1500 cc. benzene were mixed and mono methylamine gas passed in until no further heat was developed. The mono methylamine hydrochloride formed was filtered off. Weight 96 g. The filtrate was steam distilled until all the benzene had been removed and the residue was cooled by adding ice and was made alkaline to Clayton Yellow. It was then treated with 300 cc. alcohol and diluted to 1200 cc. and allowed to stand overnight. An oil layer (150 g.) was separated and the aqueous layer was acidified and the white oil methyl sulphonamide drawn off. Weight 230 g. This was dried by adding carbon tetrachloride and then distilling this off under vacuum to remove the water. Analysis: sulphur 11.4%, chlorine 4.8% an nitrogen 3.06%.

Example XII

One thousand grams of liquid ammonia was placed in a three liter flask, cooled with an acetone carbon ice bath. To this was added over a period of 2 hours 700 grams chlor heptane sulphonyl chlorides. (Analysis: chlorine 30.3%, sulphur, 13.9%.) No evidence of a violent reaction was noted. The product was stirred 6 hours at the carbon ice acetone bath temperature and then allowed to come up to room temperature overnight. The next morning 1600 cc. water was added and the thin brown colored oil was separated. Weight 525 g. This oil was washed again with distilled water and then dried under high vacuum at 60°. Analysis: chlorine 19.23%, sulphur 13.29% and nitrogen 5.82%.

Example XIII

One thousand grams of liquid mono-methylamine was placed in a 3 liter flask and cooled in an acetone carbon ice bath. 500 grams chlor heptane sulphonyl chlorides (chlorine 30.3%, sulphur 13.9%) were added slowly over a two hour period. The mass was then gradually allowed to come up to room temperature overnight and was mixed with 2 liters of water and shaken well to remove any dissolved methylamine hydrochloride. The thick brown oil was drawn off and placed under high vacuum (.1 mm.) on a water bath at 80° for 5 hours. This removed the water, heptane and chlor heptane. Analysis: chlorine 11.8%, sulfur 14.8% and nitrogen 6.8%.

Example XIV

One thousand grams of methylamine was placed in a 3 liter flask cooled in an acetone carbon ice bath and to this was added 500 g. white oil suphonyl chloride (chlorine 15.19%, sulphur 9.52%) over a period of two hours. The product was stirred over the week-end gradually, allowing it to come up to room temperature. It was then treated with 2,000 cc. water, shaken well, and the oil separated and washed with a fresh 2,000 cc. water. The oil was then dried in a water bath under a high vacuum and again separated. The analysis: sulphur 9.4%, chlorine 4.8% and nitrogen 4.14%.

Example XV

Thirty grams of scale wax sulphonyl chlorides, and 100 cc. of liquid ammonia were mixed thoroughly. The ammonia was allowed to evaporate, water was added to the reaction mixture, and the mass was extracted with ether. The ether solution was dried over sodium sulphate, filtered, and evaporated to dryness. The yield of product was 27 grams.

Example XVI

Thirty grams of scale wax sulphonyl chloride, and 200 cc. of liquid ammonia were mixed and the ammonia was allowed to evaporate with occasional stirring. The product, worked up as in the preceding example, was a brownish, soft mass. Yield, 20 grams.

Example XVII

Fifty grams of p-anisidine and 60 g. cetane sulphonyl chlorides were put in a 200 cc. flask and the reaction mixture was warmed slowly to 50° C. with stirring. A reaction then set in and the temperature rose to 90° C. After ten hours on the steam bath, the product, a brown oil, was heated on the steam bath for five hours with hydrochloric acid. On cooling, a dark colored soft solid separated, which was washed several times with water, dissolved in benzene and washed further with water. The benzene solution was evaporated to get 61.5 g. of a black viscous product.

Example XVIII

Sixty grams of cetane sulphonyl chlorides and 30 grams of glycine were heated for 14 hours on the steam bath. No reaction occurred so the reaction mixture was heated at 150° C. for two hours. On cooling the product was a viscous, black tar which was soluble in water to give an opalescent, foaming solution. An oily layer separated slowly when a portion of this solution was acidified with hydrochloric acid. Addition of sodium hydroxide to another portion gave a flocculent precipitate. To the main portion of the product was added 40 cc. of concentrated hydrochloric acid in 500 cc. of water. This reaction mixture was heated on the steam bath for five hours and the oily layer which separated was extracted with benzene. Evaporation of the benzene left a viscous, brown paste which dissolved in water to give an almost clear, foaming solution which gave a precipitate with calcium chloride solution. The neutral equivalent of the product was 278 and the acid number was 195.

Example XIX

About 5 grams of cetane sulphonyl chlorides were treated with an approximately equal weight of diethanolamine. In a few minutes the reaction mixture became very hot. The product was a viscous, pale amber colored liquid, readily soluble in water to give a foaming solution which wet sulphur.

Example XX

Cetane sulphonyl chlorides were added to a saturated aqueous solution of glycine. After being shaken for some time the solution was made just neutral with sodium hydroxide. The cloudy solution gave a slight, persistent foam. A similar result was obtained by substituting sulphanilic acid for the glycine.

Example XXI

Approximately equal parts of cetane sulphonyl chlorides and methyl maltosamine were mixed. A viscous, oily product was obtained which, when diluted with water, gave a cloudy, foaming solution.

Example XXII

The 1,4 bis anthraquinonyl octyl sulphonamides were prepared by mixing the following compounds:

| | Grams |
|---|---|
| 1,4 diamino anthraquinone | 10 |
| Octane chloro-sulpho-chlorides | 20 |
| Benzene | 100 |
| Dry sodium acetate | 10 | and refluxing the mixture for about two hours. It was then diluted with water, benzene steam distilled off, filtered, washed, and dried. The yield was 10 g., and the product had the following characteristics, M. P. 200–210°, S—3.23%, N—6.05%.

Similar results were obtained by substituting 10 g. of 1,4-di(methylimido) anthraquinone for the 1,4-diamino anthraquinone.

Example XXIII

As an alternative method of making the compounds of Example XXII, the following were mixed:

| | Grams |
|---|---|
| 1,4 diamino anthraquinone | 10 |
| Octane chloro-sulpho-chloride | 220 |
| Acetic acid glacial | 100 |
| Dry sodium acetate | 10 |

The mixture was refluxed for one hour, diluted with water, and the tarry mass which separated was extracted with petroleum ether, to remove excess octane chloro-sulpho-chloride, and dried. A yield of 14 grams of a product having the following characteristics—M. P. 85–95°, S—3.09%, N—5.50%—was obtained.

The initial compounds set forth in the above examples are only representative of many other compounds which could be used. Thus, the reaction products obtained by using a gaseous mixture of sulphur dioxide and chlorine according to the aforedescribed process with any saturated liquid or easily liquefiable hydrocarbon may be substituted for the specific mixtures as examples of specific other hydrocarbons mention is made of pentane, octane, nonane, decane, dodecane, octadecane, tetracosane, or cyclohexane, menthane, pinane, camphane, naphthanes, etc. Likewise, substituted hydrocarbons such as long chain aliphatic carboxylic acids, e. g. stearic, palmitic, etc., alkyl halides, e. g. octadecyl bromide, hexadecyl chloride, cyclohexyl bromide, cyclohexyl chloride, alcohols, e. g. decyl alcohol, dodecyl alcohol, and octadecyl alcohols may be used as initial reactants. One may also use the long chain aliphatic esters and other non-functional derivatives. Mixtures of each of the herein described compounds may also be used.

In place of the specific amines set forth in the preceding examples, may be substituted any simple or mixed amine which has a hydrogen atom attached to a nitrogen atom thereof including mono-, di- and polyamines as well as heterocyclic amines. As further examples of operative amines, mention is made of dimethylamine, diethylamine, n- and iso-propylamine, mixed alkyl amines, e. g. methyl-ethylamine, methyl octylamine, mixed aryl alkylamines, e. g. phenyl-methyl amine, ethylene diamine, propylene diamine, hexamethylene tetramine, piperidine and C-methyl piperidine, etc.

The organic sulphonamides produced by this invention are useful as plasticizers or intermediates for plasticizers; for various cellulose derivatives, resins, etc., e. g. ethyl and methyl cellulose, cellulose acetate, cellulose glycollate, nitro-cellulose, polyvinyl esters, e. g. polyvinyl chloride, polyvinyl alcohol, polymeric acrylic and methacrylic acid esters, etc. They have surface activity in strongly alkaline media and may be of value as spreading agents for insecticides. They are of interest as intermediates for the preparation of insecticides. Other uses include gasoline chemical intermediates and intermediates for water-proofing agents. The chief advantages of these amides are their cheapness, ease of preparation and their stability.

As many apparently widely different embodiments of this invention may be made without departing from the spirit and scope thereof, it is to be understood that I do not limit myself to the specific embodiments hereof except as defined in the appended claims.

I claim:

1. A mixture of organic sulphonamides prepared by reacting a nitrogen base having at least one hydrogen atom attached to a nitrogen atom thereof taken from the class consisting of ammonia and amines with a saturated hydrocarbon sulphonyl chloride obtained by reacting a gaseous mixture of sulphur dioxide and chlorine with a non-gaseous saturated hydrocarbon taken from the class consisting of saturated aliphatic open chain and saturated alicyclic hydrocarbons.

2. A mixture of organic sulphonamides prepared by reacting a nitrogen base having at least one hydrogen atom attached to a nitrogen atom thereof taken from the class consisting of ammonia and amines with a saturated aliphatic hydrocarbon sulphonyl chloride obtained by reacting a gaseous mixture of sulphur dioxide and chlorine with a non-gaseous saturated aliphatic open chain hydrocarbon.

3. A mixture of organic sulphonamides prepared by reacting a nitrogen base having at least one hydrogen atom attached to a nitrogen atom thereof taken from the class consisting of ammonia and amines with a saturated alicyclic hydrocarbon sulphonyl chloride obtained by reacting a gaseous mixture of sulphur dioxide and chlorine with a non-gaseous alicyclic hydrocarbon.

ARTHUR L. FOX.